US008722832B2

(12) United States Patent
Fantinel et al.

(10) Patent No.: US 8,722,832 B2
(45) Date of Patent: *May 13, 2014

(54) ETHYLENE TERPOLYMERS

(75) Inventors: Fabiana Fantinel, Frankfurt (DE); Shahram Mihan, Bad Soden (DE); Isabella Camurati, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 425 days.

This patent is subject to a terminal disclaimer.

(21) Appl. No.: 12/735,034

(22) PCT Filed: Nov. 27, 2008

(86) PCT No.: PCT/EP2008/010049
§ 371 (c)(1),
(2), (4) Date: Jun. 10, 2010

(87) PCT Pub. No.: WO2009/080174
PCT Pub. Date: Jul. 2, 2009

(65) Prior Publication Data
US 2010/0298501 A1   Nov. 25, 2010

(30) Foreign Application Priority Data
Dec. 19, 2007   (EP) .................................... 07024592

(51) Int. Cl.
C08F 210/04   (2006.01)
C08F 10/04    (2006.01)
C08F 4/69     (2006.01)
(52) U.S. Cl.
USPC .................. 526/348.6; 526/348; 526/169
(58) Field of Classification Search
USPC .............. 526/348.6, 352, 170, 160, 172, 161, 526/169, 348
IPC ............................................ C08F 210/08,10/08
See application file for complete search history.

(56) References Cited

U.S. PATENT DOCUMENTS

| | | | |
|---|---|---|---|
| 3,242,150 A | 3/1966 | Scoggin | |
| 3,248,179 A | 4/1966 | Norwood | |
| 3,981,849 A * | 9/1976 | Frese et al. ...................... | 526/82 |
| 5,250,628 A * | 10/1993 | Seguela et al. ................. | 525/210 |
| 5,272,236 A | 12/1993 | Lai et al. | |
| 5,318,849 A * | 6/1994 | Mehalla et al. ................ | 428/407 |
| 5,427,807 A | 6/1995 | Chum et al. | |
| 6,773,808 B2 * | 8/2004 | Ogawa et al. .................. | 428/349 |
| 6,911,516 B1 | 6/2005 | Mihan et al. | |
| 7,534,847 B2 | 5/2009 | Mihan et al. | |
| 2001/0025091 A1 * | 9/2001 | Tincul et al. ................. | 526/124.3 |
| 2005/0131158 A1 * | 6/2005 | Kizu et al. .................... | 525/240 |

FOREIGN PATENT DOCUMENTS

| | | | | |
|---|---|---|---|---|
| EP | 1541 599 | | 9/2008 | |
| JP | 59-193913 A | * | 11/1984 | ............ C08F 297/06 |
| JP | 4-63809 A | * | 2/1992 | ............ C08F 210/16 |
| SU | 975725 A1 | | 11/1982 | |
| WO | WO 93/08221 | | 4/1993 | |
| WO | WO9403509 A1 | | 2/1994 | |
| WO | WO 96/00243 | | 1/1996 | |
| WO | WO 97/04015 | | 2/1997 | |
| WO | WO 97/36937 | | 10/1997 | |
| WO | WO 98/22486 | | 5/1998 | |
| WO | WO 98/40419 | | 9/1998 | |
| WO | WO 99/06414 | | 2/1999 | |
| WO | WO 00/05277 | | 2/2000 | |
| WO | WO 00/24787 | | 5/2000 | |
| WO | WO 00/31090 | | 6/2000 | |
| WO | WO 00/35928 | | 6/2000 | |
| WO | WO 2004/020479 | | 3/2004 | |
| WO | WO 2004/056482 | | 7/2004 | |
| WO | WO 2006/063826 | | 6/2006 | |
| WO | WO 2008/052673 | | 5/2008 | |

OTHER PUBLICATIONS

Izzo et al., Macromolecules, 1999, 32, 6913-6916.*
Lettau, Chemie der Heterocyclen, 1$^{st}$ Edition, VEB, Weinheim, (1979), pp. 17-27.
John A. Ewen, Robert L. Jones, Michael J. Elder, "Metalorganic Catalysts for Synthesis and Polymerisation," Springer Verlag, (1999), pp. 150-169.
C. J. Carman, R.A. Harrington, and C. E. Wilkes, "Monomer Sequence Distribution in Ethylene-Propylene Rubber Measured by C NMR.3 Use of Reaction Probability Model," Macromolecules, vol. 10, No. 3, May-Jun. 1977, pp. 536-544.
Masahir Kakugo, Yukio Naito, Kooji Mizunuma, and Tatsuya Miyatake, "C NMR Determination of Monomer Sequence Distribution in Ethylene-Propylene Copolymers Prepared with TiCl$_3$-Al(C$_2$H$_5$)2C1," Macromolecules, (1982), vol. 15, pp. 1150-1152.
James C. Randall, "A Review of High Resolution Liquid Carbon Nuclear Magnetic Resonance Characterizations of Ethylene-Based Polymers," Macromol. Chem. Phys., C29 (2&3), (1989), pp. 201-317.
H. Benoit, P. Rempp, and Z. Grubisic, "A Universal Calibration for Gel Permeation Chromatrography," J. Polymer Sci., Phys. Ed., vol. 5, (1967), pp. 753-759.

* cited by examiner

Primary Examiner — Rip A. Lee

(57) ABSTRACT

A copolymer of ethylene, a catalyst system suitable to prepare the copolymer, and a process to prepare such copolymer are described. The copolymer comprises from 60 to 80% by weight of ethylene and from 20 to 40% by weight of at least one first α-olefin comonomer having n carbon atoms and at least one second α-olefin comonomer having (n−1) carbon atoms, n being from 4 to 13, has a polydispersity $M_w/M_n$ equal to or lower than 3.5, and a density from 0.855 to 0.880 g/cm$^3$. The copolymer is obtained by subjecting ethylene and said at least one first α-olefin comonomer to a polymerization stage in the presence of a catalyst system capable of forming a copolymer of ethylene and said at least one first α-olefin comonomer having n carbon atoms, while forming the second α-olefin comonomer having (n−1) carbon atoms.

11 Claims, No Drawings

ETHYLENE TERPOLYMERS

CROSS-REFERENCE TO RELATED APPLICATIONS

This application is the U.S. national stage under 35 U.S.C. §371 of International Application PCT/EP2008/010049, filed Nov. 27, 2008, claiming priority to EP Patent Application No. 07024592.3, filed Dec. 19, 2007; the disclosures of International Application PCT/EP2008/010049 and EP Patent Application No. 07024592.3, each as filed, are incorporated herein by reference.

FIELD OF THE INVENTION

The present invention relates to ethylene polymers, in particular to ethylene copolymers, more particularly but not exclusively elastomeric ethylene copolymers, as well as to a process to prepare such ethylene copolymers.

In the present description and in the following claims, unless otherwise indicated, the term "polymer" is used to indicate both a homopolymer, i.e. a polymer comprising repeating monomeric units derived from equal species of monomers, and a copolymer, i.e. a polymer comprising repeating monomeric units derived from at least two different species of monomers, in which case reference will be made to a binary copolymer, to a terpolymer, etc. depending on the number of different species of monomers present.

More particularly, the present invention relates to ethylene terpolymers, i.e. to copolymers comprising repeating ethylene units and at least two further comonomers of different species other than ethylene, namely at least one first α-olefin comonomer and at least one second α-olefin comonomer.

In an analogous manner, unless otherwise specified, in the present description and in the following claims, the term "polyethylene" is used to indicate both an ethylene homopolymer and a copolymer of ethylene and at least a further comonomer.

In the present description and in the following claims, the expression "elastomeric ethylene copolymer" is intended to indicate a copolymer of ethylene and at least one further comonomer having a density equal to or lower than 0.905 g/cm$^3$ and a glass transition temperature $T_g$ equal to or lower than −30° C., wherein the density and the glass transition temperature are measured as described in more detail in the detailed description of preferred embodiments of the invention.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

PRIOR ART

Copolymers of ethylene with further monomers are a substantial fraction of the olefin polymer production. Although the bulk of ethylene polymers are thermoplastics, there is a growing further need for plastomeric and elastomeric thermoplastic olefin polymers. Copolymers of ethylene with higher olefin monomers, namely $C_4$ or higher, are well known and used in the art. Among these there are linear low density polyethylenes, which are conventionally produced as copolymers of ethylene with 1-butene or 1-octene using traditional Ziegler-Natta catalyst systems. These materials typically have a relatively broad molecular weight distribution, i.e. a relatively high value of polydispersity, generally higher than 4, and broad composition distributions, i.e. a concentration of branches sensibly varying along the length of a molecule and from molecule to molecule.

Some of the ethylene-$C_4$ copolymers or copolymers of ethylene with higher monomers find application as elastomers. There are generally three families of elastomers made from such copolymers.

A first class is typified by ethylene-propylene copolymers (EPR) which are saturated compounds, of low crystallinity, requiring vulcanization with free-radical generators to achieve adequate elastic properties.

In the present description and in the following claims, a copolymer of low crystallinity has a melting enthalpy ($\Delta Hf$) lower than 30 J/g, preferably lower than about 20 J/g, wherein the melting enthalpy is measured by means of the DSC technique as described in more detail in the detailed description of preferred embodiments of the invention.

A second class of elastomers is typified by ethylene-propylene terpolymers (EPDM), again of low crystallinity, which contain a small amount of a non-conjugated diene such as ethylidene norbornene. The residual unsaturation provided by the diene termonomer allows for vulcanization with sulfur, which then yields elastomeric properties.

Yet a third class is typified by ethylene-alpha olefin copolymers of narrow composition distribution which possess elastomeric properties even in the absence of vulcanization. Prior art copolymers of this type can be prepared by metallocene catalyst systems. PCT patent application WO93/08221, in the name of Dow, describes a class of substantially linear polyolefin copolymer elastomers with narrow composition distribution. These are produced with constrained geometry catalyst systems, as for example described in documents U.S. Pat. No. 5,272,236 and U.S. Pat. No. 5,427,807, and have narrow polydispersities, narrow composition distributions and melting point ranges corresponding to random copolymers.

Representatives of these known copolymers having a narrow composition distribution are ethylene/1-butene copolymers sold as Exact™ by Exxon Chemical, ethylene/1-octene copolymers sold as Engage™ by Dow Chemical, ethylene/1-butene copolymers sold as ENR™ by Dow Chemical and ethylene/1-octene copolymers sold as TAFMER™ by Mitsui Petrochemical Industries, Ltd.

One of the main disadvantages of this third class of elastomers is the relatively high percentage of comonomers that must be added to ethylene monomers in the polymerization process in order to obtain the desired levels of low crystallinity, low density and low glass transition temperature $T_g$ that are required for optimal elastomeric performance of the final polymer. A relatively high percentage of comonomers, in turn, generally results in an undesired increase of the stickiness of the copolymer.

In the attempt of at least partially overcoming this disadvantage, olefin compositions have been developed made by blending an ethylene copolymer with another polymer, for example polypropylene. However, the blending is an undesirable additional step in the production process following the polymerization step.

SUMMARY OF THE INVENTION

In view of the above, the Applicant has perceived the need of providing, within the group of ethylene copolymers having a narrow molecular distribution, a new ethylene copolymer having the desired levels of low density and preferably a predetermined value of glass transition temperature $T_g$ suitable for ensuring improved elastomeric performance, which can be prepared in a single step during the polymerization reaction, thus avoiding a blending step following the polymerization step.

In the present description and in the following claims, a molecular weight distribution of a polymer shall be considered narrow if the polydispersity $M_w/M_n$ is equal to or lower than 3.5, preferably lower than 3, wherein $M_w$ is the weight average molar mass and $M_n$ is the number average molar mass.

In view of the above, the technical problem underlying the present invention may be said that of providing ethylene copolymers having a narrow molecular distribution and a crystallinity below a predetermined value, which can be prepared in a single step during the polymerization reaction, thus avoiding a blending step following the polymerization step, while ensuring a sufficient processability, in particular with reference to the avoidance of stickiness problems both in the reactor and in optional further treatments provided downstream of the reactor, such as for example a pelletization step.

The Applicant has surprisingly found that an ethylene copolymer having a narrow molecular distribution and a cristallinity below a predetermined value may be obtained by polymerizing ethylene and at least one first higher alpha-olefin comonomer having n carbon atoms, in the presence of a catalyst system which is able to produce at least one second alpha-olefin comonomer having (n−1) carbon atoms.

In other words, the Applicant has found that it is possible to obtain an ethylene copolymer of generic formula $C_2C_{(n-1)}C_n$, i.e. an ethylene terpolymer, by using, as comonomer, a first alpha-olefin having n carbon atoms, the second alpha-olefin having n−1 carbon atoms being produced by the catalyst system. Such a copolymer exhibits lower crystallinity and a lower glass transition temperature $T_g$, when compared to prior art ethylene copolymers.

In the present description and in the following claims, said higher alpha-olefin comonomer having n carbon atoms, which is polymerized together with ethylene, will be identified as $C_n$, and said second alpha-olefin comonomer having (n−1) carbon atoms, which is produced by the catalyst system, will be identified as $C_{(n-1)}$.

Accordingly, according to a first aspect thereof, the present invention provides a copolymer of ethylene and at least one first α-olefin comonomer and at least one second α-olefin comonomer, the first α-olefin comonomer having n carbon atoms and the second α-olefin comonomer having (n−1) carbon atoms having the features defined in attached claim 1. Said copolymer comprises from 60 to 80% by weight of ethylene and from 20 to 40% by weight of said comonomers, 20 to 40% by weight being the total amount of said at least two comonomers. Furthermore, said copolymer has a polydispersity $M_w/M_n$ equal to or lower than 3.5, and a density from 0.855 to 0.880 g/cm³.

Advantageously, the ethylene copolymers according to the invention have a lower hardness in comparison with the prior art ethylene copolymers which, in turn, advantageously allows to make the copolymers of the invention particularly suitable to be used for the manufacture of grips, handles, etc. However, although the ethylene copolymers of the invention have a lower hardness in comparison with the prior art ethylene copolymers, these ethylene copolymers do not exhibit the stickiness problems shown by the copolymers of the prior art, thus having improved processability.

Furthermore, the tensile properties of the ethylene copolymers of the invention are advantageously improved, in particular in terms of elongation at break and stress at break.

Preferably, the melting enthalpy $\Delta H_f$ as determined by DSC analysis is lower than 30 J/g, more preferably lower than 20 J/g and, still more preferably, lower than 10 J/g.

Preferably, the copolymers of the invention have a low glass transition temperature $(T_g)$ equal to or lower than −30° C., preferably equal to or lower than −40° C., still more preferably equal to or lower than −45° C., still more preferably from −45° C. to −60° C., which advantageously allows to confer an enhanced softness to the articles prepared starting from the copolymer.

The above-mentioned copolymers preferably have a Shore A (5 seconds) hardness lower than 80, more preferably lower than 60. Still more preferably, the Shore A (5 seconds) hardness is lower than 45.

The copolymers of the invention show a low stress at break, preferably from 0.3 to 2 MPa, more preferably from 0.4 to 1.6 MPa. Elongation at break is preferably comprised from 600% to 5000%, more preferably higher than 1000%, even more preferably higher than 2000%.

The copolymers of the invention comprise from 60 to 80% by weight of ethylene and from 20% to 40% by weight of the at least two alpha-comonomers, 20 to 40% by weight being the total amount of said at least two comonomers.

Preferably, the ethylene copolymers according to the invention comprise from 15 to 35% by weight of said first α-olefin comonomer having n carbon atoms, and from 0.5 to 5% by weight of said second α-olefin comonomer having (n−1) carbon atoms.

The $C_n$ and $C_{(n-1)}$ comonomers are alpha-olefins, wherein n is preferably 4-13, more preferably 4-10 and, still more preferably, 4-8, still more preferably 4-6, more particularly 4.

Preferably, the at least one first alpha-olefin comonomer $C_n$ is selected from the group comprising, more preferably consisting of, 1-butene, 1-hexene, 4-methyl-1-pentene, 1-octene, 1-decene. Preferably, the at least one first alpha-olefin comonomer is 1-butene.

Accordingly, the at least one second alpha-olefin comonomer $C_{n-1}$ is preferably selected from the group comprising, more preferably consisting of, 1-propene, 1-pentene, 1-heptene, 1-nonene. In the preferred embodiment according to which the at least one first alpha-olefin comonomer is 1-butene, the at least one second alpha-olefin comonomer is 1-propene.

According to a particularly preferred embodiment, the copolymer is a copolymer of ethylene and of a first alpha-olefin comonomer $C_4$ and of a second alpha-olefin comonomer $C_3$ which is produced by the catalyst system, in other words is a $C_2$ $C_3$ $C_4$ terpolymer.

The density of the ethylene copolymers of the present invention, as measured in accordance with standard DIN EN ISO 1183-1, variant A, is generally in the range from 0.855 g/cm³ to 0.905 g/cm³, depending on the type of alpha-olefin comonomers, preferably from 0.855 to 0.895 g/cm³, more preferably from 0.855 to 0.880 g/cm³, still more preferably from 0.860 to 0.880 g/cm³. At densities above 0.905 g/cm³, the ethylene copolymers are insufficiently elastic. At densities below 0.855 g/cm³, the copolymers are tacky and difficult to be prepared, processed and handled.

Preferably, the copolymers have a monomodal molecular weight distribution, i.e. the curve of the molecular weight distribution determined by GPC has a single peak.

Preferably, the polydispersity $M_w/M_n$ of the copolymers is equal to or lower than 3.5, preferably equal to or lower than 3.3, more preferably equal to or lower than 3 and, still more preferably, from 2 to 3.

The intrinsic viscosity of the copolymers is preferably comprised from 0.8 and 4 dl/g, more preferably comprised between 0.8 and 3 dl/g.

The Melt Flow Index ($MFR_{190/2.16}$) of the copolymers according to the invention is comprised from 0.1 to 10 dg/min, preferably from 0.3 to 5 dg/min, still more preferably from 0.3 to 3.5 dg/min.

The ethylene copolymers according to the invention show a predetermined degree of short chain branching (SCB) of the methyl, ethyl and propyl kind, which are determined by means of $^{13}$C-NMR spectroscopy.

Preferably, the methyl side chain content per 1000 carbon atoms in the polymer chain (Me/1000 C) varies from 6 to 12, the ethyl side chain content per 1000 carbon atoms in the polymer chain (Et/1000 C) varies from 60 to 100, and the propyl side chain content per 1000 carbon atoms in the polymer chain (Pr/1000 C) varies from 0.7 to 1.3.

No substantial long chain branching (LCB) is detected, so that the copolymers according to the invention are considered to be substantially linear.

Ethylene copolymers of the type described above are particularly suitable to be used as impact modifiers with the aim of increasing the impact performances both at room and low temperature of homopolymers, preferably but not exclusively ethylene homopolymers.

Accordingly, the present invention provides also a composition comprising an elastomeric ethylene copolymer as defined and one or more ethylene homopolymers, copolymers and/or blends. Such compositions in which the ethylene copolymer of the invention is present as a significant component are ones which contain from 40 to 100% by weight, preferably from 50 to 99% by weight, still more preferably from 60 to 90% by weight, of the copolymer of the invention, based on the total weight of the polymer composition.

The polymers and polymer mixtures of the present invention are very useful, for example, for the production of films on blown film and cast film plants at high outputs. The films made of the polymer mixtures display very good mechanical properties, high shock resistance and high tear strength combined with very good optical properties, in particular transparency and gloss. They are particularly useful for the packaging sector, for example as heat sealing films, and both for labels and sacks and for the food sector. Furthermore, the films display only a slight blocking tendency and can therefore be passed through machines without additions of lubricants and antiblocking agents or with additions of only small amounts thereof.

Owing to their good mechanical properties, the ethylene copolymers of the present invention are likewise suitable for the production of fibers and moldings, in particular pipes and crosslinkable pipes. They are likewise suitable for blow molding, rotomolding or injection molding. They are also useful as compounding components, bonding agents and as rubber component in polypropylene, in particular in polypropylene compounds having high impact toughnesses.

The ethylene copolymers of the invention are also particularly suitable to be used for the manufacture of grips, handles, and the like.

An ethylene copolymer having the features defined in claim 1 may be for example prepared by a catalyst system comprising a catalyst containing a transition metal complex, where a transition metal is a metal of groups 3-12 of the Periodic Table of the Elements, preferably a metal of groups 4-6 of the Periodic Table of the Elements.

In a preferred embodiment, the transition metal is chromium. Still more preferably, the catalyst system comprises a catalyst of the chromium single site type.

An elastomeric ethylene copolymer having the features defined in claim 1 may be for example obtained by means of the catalyst system described below, referring to a further, non-limiting aspect of the invention.

In the present description and in the following claims, the expression "chromium single site catalyst" is used to indicate a catalyst comprising a coordination chromium complex capable of polymerizing ethylene and at least one first alpha-olefin comonomer, so as to obtain a polyethylene having a narrow molecular weight distribution which, as specified above, is meant to correspond to a polydispersity $M_w/M_n$ equal to or lower than 3.5, preferably lower than 3.3, more preferably lower than 3 and, still more preferably, between 2 and 3.

More particularly, according to a further aspect thereof, the present invention provides a catalyst system comprising a chromium single site catalyst capable of forming a copolymer of ethylene and at least one first α-olefin comonomer having n carbon atoms and at least one second α-olefin comonomer having (n−1) carbon atoms, said at least one second α-olefin comonomer having (n−1) carbon atoms being formed by the catalyst, the catalyst comprising a monocyclopentadienyl complex of the formula $Cp-Y_m Cr$, wherein Cp is a cyclopentadienyl system, Y is a substituent which is bound to Cp and contains at least one uncharged donor containing at least one atom of group 15 or 16 of the Periodic Table, m is 1, 2 or 3.

Catalysts according to the present invention as well as their method of preparation are disclosed in WO2006/063826.

Particularly useful monocyclopentadienyl complexes are ones in which Y is formed by the group —$Z_k$-A- and together with the cyclopentadienyl system Cp and chromium forms a monocyclopentadienyl complex comprising the structural element of the formula $Cp-Z_k$-A-Cr, where the variables have the following meanings:

$Cp-Z_k A$ is

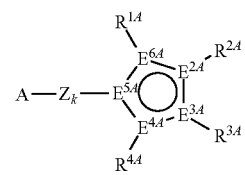

where the variables have the following meanings:
$E^{1A}$-$E^{5A}$ are each carbon or not more than one $E^{1A}$ to $E^{5A}$ is phosphorus,
$R^{1A}$-$R^{4A}$ are each, independently of one another, selected from the group consisting of hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, $NR^{5A}_2$, $N(SiR^{5A}_3)_2$, $OR^{5A}$, $OSiR^{5A}_3$, $SiR^{5A}_3$, $BR^{5A}_2$, wherein the organic radicals $R^{1A}$-$R^{4A}$ may also be substituted by halogens, and further two vicinal radicals $R^{1A}$-$R^{4A}$ may also be joined to form a five-, six- or seven-membered carbocyclic ring, and/or two vicinal radicals $R^{1A}$-$R^{4A}$ may be joined to form a five-, six- or seven-membered heterocycle which contains at least one atom from the group consisting of N, P, O or S, wherein said carbocylce or heterocycle preferably form a condensed aromatic system with the cyclopentadienyl motiety and/or may be further substituted with hydrogen or, independently, radicals $R^{5A}$ And, independently from the afore said, preferably with the condition that at least one $R^{1A}$—$R^{4A}$ is an, preferably unfused or non-joined, arylalkyl having from 1 to 10 carbon atoms in the alkyl radical and 6-20 carbon atoms in the aryl radical, where the aryl may also be substituted by N-, P-, O- or S-containing substituents, $C_1$-$C_{22}$-alkyl, $C_2$-$C_{22}$-alkenyl, halogens or haloalkyls or haloaryls having 1-10 carbon atoms, the radicals $R^{5A}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical and two geminal radicals $R^{5A}$ may also be joined to form a five- or six-membered ring, The bridge Z between the cyclopentadienyl system Cp and the uncharged donor A is preferably an organic divalent bridge (k=1), preferably consisting of carbon- and/or silicon- and/or boron-containing bridge members. Changing the length of the link between the cyclopentadienyl system and A enables the activity of the catalyst to be influenced.

A is an uncharged donor containing an atom of group 15 or 16 of the Periodic Table or a carbene, preferably one or more atoms selected from the group consisting of oxygen, sulfur, nitrogen and phosphorus, preferably nitrogen and phosphorus. The donor function in A can be bound intermo-lecularly or intramolecularly to the chromium. The donor in A is preferably bound intramolecularly to chromium. Possible donors are uncharged functional groups containing an element of group 15 or 16 of the Periodic Table, e.g. amine, imine, carboxamide, carboxylic ester, ketone (oxo), ether, thioketone, phosphine, phosphite, phosphine oxide, sulfonyl, sulfonamide, carbenes such as N-substituted imidazol-2-ylidene or unsubstituted, substituted or fused, heterocyclic ring systems. The synthesis of the bond from A to the cyclopentadienyl radical and Z can be carried out, for example, by a method analogous to that of WO 00/35928.

A is preferably a heteroaromatic system, preferably an unsubstituted, substituted and/or fused six-membered heteroaromatic having 1, 2, 3, 4 or 5 nitrogen atoms in the heteroaromatic part, in particular substituted and unsubstituted 2-pyridyl, 2-quinolyl or 8-quinolyl.

In preferred cyclopentadienyl systems Cp, all $E^{1A}$ to $E^{5A}$ are carbon.

One of the substituents $R^{1A}$-$R^{4A}$ is always an alkylaryl having from 1 to 10 carbon atoms in the alkyl radical and 6-20 carbon atoms in the aryl radical in order to achieve the desired results. The remaining substituents can be varied widely and possible carboorganic substituents $R^{1A}$-$R^{4A}$ are, for example, the following; $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or a $C_6$-$C_{10}$-aryl group as substituent, e.g. cyclopropane, cyclobutane cyclopentane, cyclohexane, cycloheptane, cyclooctane, cyclononane or cyclododecane, $C_2$-$C_{22}$-alkenyl which may be linear, cyclic or branched and in which the double bond can be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5-, or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two of the radicals $R^{1A}$ to $R^{4A}$ may also be joined to form a 5-, 6- or 7-membered ring and/or two of the vicinal radicals $R^{1A}$-$R^{4A}$ may be joined to form a five-, six- or seven-membered heterocycle which contains at least one atom from the group consisting of N, P, O or S and/or the organic radicals $R^{1A}$-$R^{4A}$ may also be substituted by halogens such as fluorine, chlorine or bromine. Furthermore, $R^{1A}$-$R^{4A}$ can also be amino $NR^{5A}_2$, or $N(SiR^{5A}_3)_2$, alkoxy or aryloxy $OR^{5A}$, for example dimethylamino, N-pyrrolidinyl, picolinyl, methoxy, ethoxy or isopropoxy. In organosilicon substituents $SiR^{5A}_3$, the radicals $R^{5A}$ can be the same carboorganic radicals as described in more detail above for $R^{1A}$-$R^{4A}$, where two $R^{5A}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{5A}_3$ radicals can also be bound to the cyclopentadienyl skeleton via an oxygen or nitrogen, for example trimethylsilyloxy, triethylsilyloxy, butyldimethylsilyloxy, tributylsilyloxy or tri-tert-butylsilyloxy. Preferred radicals $R^{1A}$-$R^{4A}$ are hydrogen, methyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly useful organosilicon substituents are trialkylsilyl groups having from 1 to 10 carbon atoms in the alkyl radical, in particular trimethylsilyl groups.

Two vicinal radicals $R^{1A}$-$R^{4A}$ together with the atoms $E^{1A}$-$E^{5A}$ bearing them can form a heterocycle, preferably a heteroaromatic, which contains at least one atom from the group consisting of nitrogen, phosphorus, oxygen and sulfur, particularly preferably nitrogen and/or sulfur, with preference being given to the atoms $E^{1A}$-$E^{5A}$ present in the heterocycle or heteroaromatic being carbon. Preference is given to heterocycles and heteroaromatics having a ring size of 5 or 6 ring atoms. Examples of 5-membered heterocycles which have from one to four nitrogen atoms and/or a sulfur or oxygen atom in addition to carbon atoms as ring members are 1,2-dihydrofuran, furan, thiophene, pyrrole, isoxazole, 3-isothiazole, pyrazole, oxazole, thiazole, imidazole, 1,2,4-oxadiazole, 1,2,5-oxadiazole, 1,3,4-oxadiazole, 1,2,3-triazole and 1,2,4-triazole. Examples of 6-membered heteroaryl groups which may contain from one to four nitrogen atoms and/or a phosphorus atom are pyridine, phosphobenzene, pyridazine, pyrimidine, pyrazine, 1,3,5-triazine, 1,2,4-triazine or 1,2,3-triazine. The 5-membered and 6-membered heterocycles can also be substituted by $C_1$-$C_{10}$-alkyl, $C_6$-$C_{10}$-aryl, alkylaryl having from 1 to 10 carbon atoms in the alkyl radical and 6-10 carbon atoms in the aryl radical, trialkylsilyl or halogens such as fluorine, chlorine or bromine, dialkylamide, alkylarylamide, diarylamide, alkoxy or aryloxy or be fused with one or more aromatics or heteroaromatics. Examples of benzo-fused 5-membered heteroaryl groups are indole, indazole, benzofuran, benzothiophene, benzothiazole, benzoxazole and benzimidazole. Examples of benzo-fused 6-membered heteroaryl groups are chromane, benzopyran, quinoline, isoquinoline, cinnoline, phthalazine, quinazoline, quinoxaline, 1,10-phenanthroline and quinolizine. Naming and numbering of the heterocycles has been taken from Lettau, Chemie der Heterocyclen, 1$^{st}$ edition, VEB, Weinheim 1979. The heterocycles/heteroaromatics are preferably fused with the cyclopentadienyl skeleton via a C—C double bond of the heterocycle/heteroaromatic. Heterocycles/heteroaromatics having one heteroatom are preferably 2,3- or b-fused.

Cyclopentadienyl systems Cp having a fused heterocycle are, for example, thiapentalene, methylthiapentalene, ethylthiapentalene, isopropylthiapentalene, n-butylthiapentalene, tert-butyl-thiapentalene, trimethylsilylthiapentalene, phenylthiapentalene, naphthylthiapentalene, methylthiopentalene, azapentalene, methylazapentalene, ethylazapentalene, isopropylazapentalene, n-bu-tylazapentalene, trimethylsilylazapentalene, phenylazapentalene, naphthylazapentalene, oxapentalene or phosphapentalene.

The synthesis of such cyclopentadienyl systems having a fused-on heterocycle is described, for example, in the above-mentioned WO 98/22486. In "metalorganic catalysts for synthesis and polymerisation", Springer Verlag 1999, Ewen et al., p. 150 ff, describe further syntheses of these cyclopentadienyl systems.

Particularly preferred substituents $R^{1A}$-$R^{4A}$ are the above-described carboorganic substituents and the carboorganic substituents which form a cyclic fused ring system, i.e. together with the $E^{1A}$-$E^{5A}$ skeleton, preferably together with a cyclopentadienyl skeleton, form, for example, an unsubstituted or substituted indenyl, indacenyl, benzindenyl, phenanthrenyl or tetrahydroindenyl system, and in particular their preferred embodiments.

Examples of such cyclopentadienyl systems (without the group —Z-A-, which is preferably located in the 1 position, and without the arylalkyl substituents) are monoalkylcyclopentadienyl systems, e.g. 3-methylcyclopentadienyl, 3-ethylcyclopentadienyl, 3-isopropylcyclopentadienyl, 3-tert-butylcyclopentadienyl, dialkylcyclopentadienyl systems, e.g. tetrahydroindenyl, 2,4-dimethyl-cyclopentadienyl or 3-methyl-5-tert-butylcyclopentadienyl, or trialkylcyclopentadienyl systems, e.g. 2,3,5-trimethylcyclopentadienyl, and also indenyl, indacenyl or benzoindenyl. The fused ring system may bear further $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, $NR^{5A}_2$, $N(SiR^{5A}_3)_2$, $OR^{5A}$, $OSiR^{5A}_3$ or $SiR^{5A}_3$ substituents, e.g. 4-methylindenyl, 4-ethylindenyl, 4-isopropylindenyl, 5-methylindenyl, 4-phenylindenyl, 5-methyl-4-phenylindenyl or 4-naphthylindenyl.

The above-mentioned catalyst can be used alone or together with further components as catalyst system for olefin copolymerization. Accordingly, the catalyst system may comprise, in addition to the monocyclopentadienyl complex as defined above, optionally an organic or inorganic support, optionally one or more activating compounds, optionally further catalyst components belonging to different classes of catalysts, and optionally one or more metal compounds containing a metal of group 1, 2 or 13 of the Periodic Table.

For the monocyclopentadienyl complex of the present invention to be able to be used in polymerization processes in the gas phase or in suspension, it is often advantageous for the same to be used in the form of a solid, i.e. to be applied to a solid support. Furthermore, the supported monocyclopentadienyl complex has a high productivity. Consequently, the monocyclopentadienyl complex of the present invention can, if desired, also be immobilized on an organic or inorganic support and be used in supported form in the polymerization. This enables, for example, deposits in the reactor to be avoided and the polymer morphology to be controlled. In a preferred method of preparing the supported catalyst system, the monocyclopentadienyl complex is brought into contact with at least one activating compound in a suitable solvent, preferably giving a soluble reaction product, an adduct or a mixture. The preparation obtained in this way is then mixed with the dehydrated or passivated support material, the solvent is removed and the resulting supported monocyclopentadienyl catalyst system is dried to ensure that all or most of the solvent is removed from the pores of the support material. The supported catalyst is obtained as a free-flowing powder. Examples of the industrial implementation of the above process are described in WO 96/00243, WO 98/40419 or WO 00/05277. In a further preferred embodiment, the activating compound is applied to the support component first and this supported compound is subsequently brought into contact with the monocyclopentadienyl complex of the present invention.

Some of the monocyclopentadienyl complexes of the present invention are brought into contact with an activator in order to enhance the polymerization activity. For this reason, the catalyst system optionally further comprises one or more activating compounds, preferably at least one cation-forming compound.

Suitable compounds which are able to react with the monocyclopentadienyl complexes to convert them into catalytically active, or more active, compounds are, for example, compounds such as an aluminoxane, a strong uncharged Lewis acid, an ionic compound having a Lewis-acid cation or an ionic compound containing a Brönsted acid as cation.

As aluminoxanes, it is possible to use, for example, the compounds described in WO 00/31090. Particularly useful aluminoxanes are open-chain or cyclic aluminoxane compounds of one of the following formulae

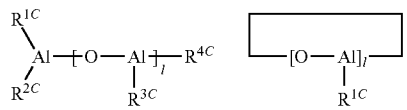

where $R^{1C}$-$R^{4C}$ are each, independently of one another, a $C_1$-$C_6$-alkyl group, preferably a methyl, ethyl, butyl or isobutyl group, and I is an integer from 1 to 30, preferably from 5 to 25. A particularly useful aluminoxane compound is methylaluminoxane.

These oligomeric aluminoxane compounds are usually prepared by controlled reaction of a solution of trialkylaluminum with water. In general, the oligomeric aluminoxane compounds obtained in this way are in the form of mixtures of both linear and cyclic chain molecules of various lengths, so that I is to be regarded as a mean. The aluminoxane compounds can also be present in admixture with other metal alkyls, usually aluminum alkyls. Suitable aluminoxane preparations are commercially available.

Furthermore, modified aluminoxanes in which some of the hydrocarbon radicals have been replaced by hydrogen atoms or alkoxy, aryloxy, siloxy or amide radicals can also be used in place of the aluminoxane compounds of the formulae indicated above.

It has been found to be advantageous to use the monocyclopentadienyl complexes and the aluminoxane compounds in such amounts that the atomic ratio of aluminum from the aluminoxane compounds including any aluminum alkyl still present to the transition metal from the monocyclopentadienyl complexes is in the range from 1:1 to 1000:1, preferably from 10:1 to 500:1 and in particular in the range from 20:1 to 400:1.

A further class of suitable activating components are hydroxyaluminoxanes. These can be prepared, for example, by addition of from 0.5 to 1.2 equivalents of water, preferably from 0.8 to 1.2 equivalents of water, per equivalent of aluminum to an alkylaluminum compound, in particular triisobutylaluminum, at low temperatures, usually below 0° C. Such compounds and their use in olefin polymerization are described, for example, in WO 00/24787. The atomic ratio of aluminum from the hydroxyaluminoxane compound to the transition metal from the monocyclopentadienyl complexes is usually in the range from 1:1 to 100:1, preferably from 10:1 to 50:1 and in particular in the range from 20:1 to 40:1.

Preference is in this case given to using a monocyclopentadienyl metal dialkyl compound.

As strong, uncharged Lewis acids, preference is given to compounds of the formula $M^{1C}X^{1C}X^{2C}X^{3C}$ where
$M^{1C}$ is an element of group 13 of the Periodic Table of the Elements, in particular B, Al or Ga, preferably B,
$X^{1C}$, $X^{2C}$ and $X^{3C}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Further examples of strong, uncharged Lewis acids are given in WO 00/31090.

Compounds of this type are boranes and boroxins such as trialkylborane, triarylborane or trimethylboroxin. Particular preference is given to using boranes which bear at least two perfluorinated aryl radicals. Particular preference is given to compounds of the formula (XII) in which $X^{1C}$, $X^{2C}$ and $X^{3C}$ are identical, preferably tris(pentafluorophenyl)borane.

Suitable compounds are preferably prepared by reaction of aluminum or boron compounds with water, alcohols, phenol derivatives, thiophenol derivatives or aniline derivatives, with halogenated and especially perfluorinated alcohols and phenols being of particular importance. Examples of particularly useful compounds are pentafluorophenol, 1,1-bis(pentafluorophenyl)methanol and 4-hydroxy-2,2',3,3',4,4',5,5',6,6'-nonafluorobiphenyl. Examples of combinations of compounds of the formula (XII) with Brönsted acids are, in particular, trimethylaluminum/pentafluorophenol, trimethylaluminum/1-bis(pentafluorophenyl)methanol, trimethylaluminum/4-hydroxy-2,2',3,3',4,4',5,5',6,6'-nonafluorobiphenyl, triethylaluminum/pentafluorophenol and triisobutylaluminum/pentafluorophenol and triethylaluminum/4,4'-dihydroxy-2,2',3,3',5,5',6,6'-octafluorobiphenyl hydrate.

In further suitable aluminum and boron compounds of the formula (XII), $X^{1C}$ is an OH group. Examples of compounds of this type are boronic acids and borinic acids, in particular borinic acids having perfluorinated aryl radicals, for example $(C_6F_5)_2BOH$.

Strong uncharged Lewis acids suitable as activating compounds also include the reaction products of a boronic acid with two equivalents of an aluminum trialkyl or the reaction products of an aluminum trialkyl with two equivalents of an acidic fluorinated, in particular perfluorinated, hydrocarbon compound such as pentafluorophenol or bis(pentafluorophenyl)borinic acid. Suitable ionic compounds having Lewis acid cations include salt-like compounds of the cation of the formula $[((M^{2C})^{a+})Q_1Q_2 \ldots Q_z]^{d+}$
where
$M^{2C}$ is an element of groups 1 to 16 of the Periodic Table of the Elements,
$Q_1$ to $Q_z$ are singly negatively charged groups such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups,
a is an integer from 1 to 6 and
z is an integer from 0 to 5,
d corresponds to the difference a-z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

Salts having noncoordinating anions can also be prepared by combining a boron or aluminum compound, e.g. an aluminum alkyl, with a second compound which can react to link two or more boron or aluminum atoms, e.g. water, and a third compound which forms an ionizing ionic compound with the boron or aluminum compound, e.g. triphenylchloromethane, or optionally a base, preferably an organic nitrogen-containing base, for example an amine, an aniline derivative or a nitrogen heterocycle. In addition, a fourth compound which likewise reacts with the boron or aluminum compound, e.g. pentafluorophenol, can be added.

Ionic compounds containing Brönsted acids as cations preferably likewise have noncoordinating counterions. As Brönsted acid, particular preference is given to protonated amine or aniline derivatives. Preferred cations are N,N-dimethylanilinium, N,N-dimethylcyclohexylammonium and N,N-dimethylbenzylammonium and also derivatives of the latter two.

Compounds containing anionic boron heterocycles as are described in WO97/36937 are also suitable, in particular dimethylanilinium boratabenzene or trityl boratabenzene.

Preferred ionic compounds contain borates which bear at least two perfluorinated aryl radicals. Particular preference is given to N,N-dimethylanilinium tetrakis(pentafluorophenyl)borate and in particular N,N-dimethylcyclohexylammonium tetrakis(pentafluorophenyl)borate, N,N-dimethylbenzylammonium tetrakis(pentafluorophenyl)borate or trityl tetrakispentafluorophenylborate.

It is also possible for two or more borate anions and/or boranes to be joined to one another or for a borate anion to be joined to a borane, as in the dianion $[(C_6F_5)_3B—C_6F_4—B(C_6F_5)_3]^{2-}$ or the anion $[(C_6F_5)_3B—CN—B(C_6F_5)_3]^-$, or the borate anion can be bound via a bridge bearing a suitable functional group to the support surface.

Further suitable activating compounds are listed in WO 00/31090.

The amount of strong, uncharged Lewis acids, ionic compounds having Lewis-acid cations or ionic compounds containing Brönsted acids as cations is preferably from 0.1 to 20 equivalents, more preferably from 1 to 10 equivalents, based on the monocyclopentadienyl complex.

Suitable activating compounds also include boron-aluminum compounds such as di[bis(pentafluorophenyl)boroxy]methylalane. Examples of such boron-aluminum compounds are those disclosed in WO 99/06414.

It is also possible to use mixtures of all the abovementioned activating compounds. Preferred mixtures comprise aluminoxanes, in particular methylaluminoxane, and an ionic compound, in particular one containing the tetrakis(pentafluorophenyl)borate anion, and/or a strong uncharged Lewis acid, in particular tris(pentafluorophenyl)borane.

Both the monocyclopentadienyl complex and the activating compound are preferably used in a solvent, preferably an aromatic hydrocarbon having from 6 to 20 carbon atoms, in particular xylenes, toluene, pentane, hexane, heptane or a mixture thereof.

In particular, the at least one first catalyst component preferably comprises a monocyclopentadienyl complex of the formula $Cp-Y_mCr$, wherein Cp is a cyclopentadienyl system preferably having an aryl substituent, Y is a substituent which is bound to Cp and contains at least one uncharged donor containing at least one atom of group 15 or 16 of the Periodic Table, m is 1, 2 or 3.

The at least one second catalyst component preferably comprises a monocyclopentadienyl complex of the formula Cp-Y$_m$Cr, wherein Cp is a cyclopentadienyl system preferably having a silyl substituent, Y is a substituent which is bound to Cp and contains at least one uncharged donor containing at least one atom of group 15 or 16 of the Periodic Table, m is 1, 2 or 3.

The silyl substituent is preferably a trialkylsilyl group having from 1 to 10 carbon atoms in the alkyl radical, in particular a trimethylsilyl group.

According to a preferred embodiment, the ratio by weight between the two catalyst components is about 1:1.

A novel and inventive process, for preparing ethylene copolymers according to the present invention, has also been developed.

The process according to the invention comprises the steps of:
providing a catalyst system comprising a catalyst containing a transition metal complex, for example a metal of groups 4-6 of the Periodic Table of the Elements, for example chromium, capable of forming a copolymer of ethylene and at least one first α-olefin comonomer having n carbon atoms, while forming at least one second α-olefin comonomer having (n−1) carbon atoms;
subjecting ethylene and said at least one first α-olefin comonomer to a polymerization stage in the presence of said catalyst system.

Accordingly, referring to a further aspect of the invention, the present invention also provides elastomeric ethylene copolymers obtained by means of the process described in the present application. More particularly, the present invention provides copolymers of ethylene and at least one first α-olefin comonomer having n carbon atoms and at least one second α-olefin comonomer having (n−1) carbon atoms, n being from 4 to 13, which copolymers are obtained by means of the process described in the present application.

The process for preparing ethylene copolymers according to the present invention is such that the chromium ashes content that is present in the final product, if not washed, is lower than 40 ppm, preferably lower than 30 ppm.

The copolymerization process according to the invention can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes or gas-phase fluidized-bed processes are all possible.

The polymerizations are usually carried out at from 60 to 350° C. under pressures of from 0.5 to 4 000 bar at mean residence times of from 0.5 to 5 hours, preferably from 0.5 to 3 hours. The advantageous pressure and temperature ranges for carrying out the polymerizations usually depend on the polymerization method. In the case of high-pressure polymerization processes, which are usually carried out at pressures of from 1 000 to 4000 bar, in particular from 2 000 to 3 500 bar, high polymerization temperatures are generally also set. Advantageous temperature ranges for these high-pressure polymerization processes are from 200 to 320° C., in particular from 220 to 290° C. In the case of low-pressure polymerization processes, a temperature which is at least a few degrees below the softening temperature of the polymer is generally set. These polymerization processes are preferably carried out at from 50 to 180° C., preferably from 70 to 120° C. In the case of suspension polymerization, the polymerization is usually carried out in a suspension medium, preferably an inert hydrocarbon such as isobutane or a mixture of hydrocarbons, or else in the monomers themselves. The polymerization temperatures are generally in the range from 20 to 115° C., and the pressure is generally in the range from 1 to 100 bar. The solids content of the suspension is generally in the range from 10 to 80%. The polymerization can be carried out batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out at from 30 to 125° C.

Among the abovementioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed phase, in which part of the circulating gas is cooled to below the dew point and is recirculated as a two-phase mixture to the reactor. It is also possible to use a multizone reactor in which two polymerization zones are linked to one another and the polymer is passed alternately through these two zones a number of times. The two zones can also have different polymerization conditions. Such a reactor is described, for example, in WO 97/04015. The different or identical polymerization processes can also, if desired, be connected in series so as to form a polymerization cascade, for example in the Hostalen process. A parallel reactor arrangement using two or more identical or different processes is also possible. Furthermore, molar mass regulators, for example hydrogen, or customary additives such as antistatics can also be used in the polymerizations.

EXAMPLES

The present invention will be further described by means of the following preferred embodiments without restricting the scope of the invention.

Intrinsic viscosity η, which is the value of the viscosity number by extrapolation of polymer concentration to zero, was determined on an automatic Ubbelohde viskometer (Lauda PVS 1) at a concentration of 0.001 g/ml in decaline as a solvent and at a temperature of 135° C. according to EN ISO 1628-1:1998.

Density of compression moulded plaques was determined according to DIN EN ISO 1183-1, Method A (Immersion). The compression moulded plaques (thickness 2 mm) were prepared with a defined thermal history: Press conditions: temperature, pressure and time: 180° C., 200 bar for 8 min, Crystallization in boiling water for 30 min.

The melt flow rate MFR was determined according to DIN EN ISO 1133:2005, condition D at a temperature of 190° C. under a load of 2.16 kg.

The comonomer content (propylene C3 and butadiene C4) was determined on $^{13}$C-NMR spectra.

$^{13}$C-NMR spectra were acquired $^{13}$C-NMR spectra were acquired on a Bruker DPX-400 spectrometer operating at 100.61 MHz in the Fourier transform mode at 120° C.

The peak $S_{\delta\delta}$ [C. J. Carman, R. A. Harrington and C. E. Wilkes, Macromolecules, 10, 3, 536 (1977)]carbon was used as internal reference at 29.9 ppm.

The samples were dissolved in 1,1,2,2-tetrachloroethane-d2 at 120° C. with a 8% wt/v concentration. Each spectrum was acquired with a 90° pulse, 15 seconds of delay between pulses and CPD (WALTZ 16) to remove 1H-13C coupling.

About 1500-2000 transients were stored in 32K data points using a spectral window of 6000 or 9000 Hz.

The assignments of the spectra, were made referring to Kakugo [M. Kakugo, Y. Naito, K. Mizunuma and T. Miyatake, Macromolecules, 15, 4, 1150, (1982)] and J. C. Randal, Macromol. Chem. Phys., C29, 201 (1989).

The determination of the molar mass distributions and the means Mn, Mw and Mw/Mn derived therefrom was carried out by high-temperature gel permeation chromatography using a method described in DIN 55672-1:1995-02 issue Februar 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB.

A WATERS Alliance 2000 equipped with the following precolumn SHODEX UT-G and separation columns SHODEX UT 806 M (3×) and SHODEX UT 807 connected in series was used. The solvent was vacuum destilled under Nitrogen and was stabilized with 0.025% by weight of 2,6-di-tert-butyl-4-methylphenol. The flowrate used was 1 ml/min, the injection was 500 µl and polymer concentration was in the range of 0.01%<conc.<0.05% w/w. The molecular weight calibration was established by using monodisperse polystyrene (PS) standards from NBS and the calibration curve was then adapted to Polyethylene (PE) by means of the Universal Calibration method (Benoit H., Rempp P. and Grubisic Z., & in J. Polymer Sci., Phys. Ed., 5, 753 (1967)). The Mark-Houwing parameters used herefore were for PS: $k_{ps}$=0.000121 dl/g, $\alpha_{ps}$=0.706 and for PE $k_{pe}$=0.000406 dl/g, $\alpha_{ps}$=0.725, valid in TCB at 135° C. Data recording, calibration and calculation was carried out using NTEQGPC-V6.4 (hs GmbH, Hauptstraße 36, D-55437 Ober-Hilbersheim).

The glass transition temperature was determined by Dynamic Mechanical Thermal Analysis (DMTA) in accordance with DIN EN ISO 6721-2, 1996. The material taken from polymerization was pressed in a sheet of 70 mm×40 mm×1 mm under 20-30 bar pressure during melting until reaching a stable temperature of 200° C. for 1 min. After this temperature is reached, the material was pressed for 4 min under 100 bar and afterwards cooled with 15 K/min. After cooling, test specimens of dimensions 12.5 mm×40 mm×1 mm were stamped from the sheet. In an oscillation measurement in torsion mode with 1 Hz excitation frequency and a strain amplitude lower than 0.04%, a temperature range of at least −100° C. to +110° C. is covered, using a heating rate of 1K/min. Tg is determined from the maximum of the loss modulus G" peak.

The melting enthalpies of the polymers ($\Delta H_f$) were measured by Differential Scanning Calorimetry (DSC) on a heat flow DSC (TA-Instruments Q2000), according to the standard method (ISO 11357-3 (1999)). The sample holder, an aluminum pan, is loaded with 5 to 6 mg of the specimen and sealed. The sample is then heated from ambient temperature to 200° C. with a heating rate of 20 K/min (first heating). After a holding time of 5 minutes at 200° C., which allows complete melting of the crystallites, the sample is cooled to −10° C. with a cooling rate of 20 K/min and held there for 2 minutes. Finally the sample is heated from −10° C. to 200° C. with a heating rate of 20 K/min (second heating). After construction of a baseline the area under the peak of the second heating run is measured and the enthalpy of fusion ($\Delta H_f$) in J/g is calculated according to the corresponding ISO (11357-3 (1999)).

The specimens for the tensile test were punched from a compression moulded sheet (thickness: 2.1±0.1 mm). The preparation follows the standard ISO 1872-2:2000 for PE. The 5A type (acc. ISO 527-2) shoulder specimen is used in the tensile test. The tensile tests were conducted according to ISO 527-1 at constant tensile speed of 500 mm/min and 50 mm initial distance between grips.

Shore A hardness tests were carried out with an A type Durometer following the procedure of standard ISO 868 (2003) on compression moulded sheets, which were prepared according ISO 1872-2:2000.

Example 1

Synthesis of [η$^5$-1-(2-methylpyridine)-3-benzyl-indenyl]dichlorochromium

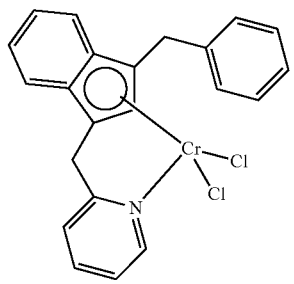

Preparation of 2-[(3-benzyl-1H-inden-1-yl)methyl]pyridine and 2-[(1-benzyl-1H-inden-3-yl)methyl]pyridine

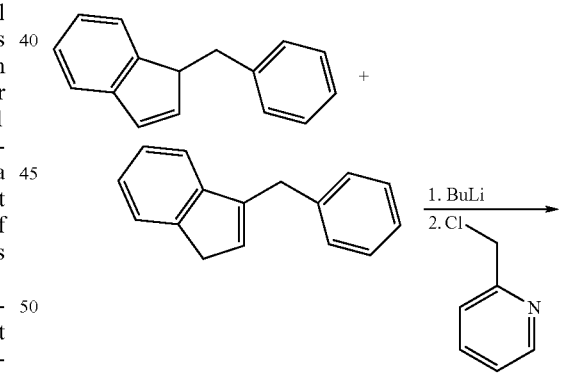

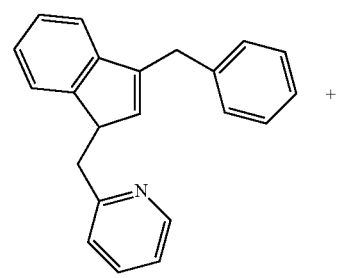

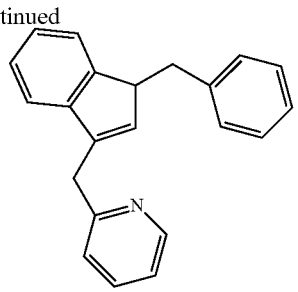

15 g (0.0727 mol) of the benzylindene (mixture of isomers) was dissolved in 150 ml Et$_2$O and treated with 29 ml 2.5M BuLi (0.0727 mol) in hexanes at −60° C. After the deprotonation was complete the lithium salt was treated with 9.27 g (0.0727 mol) 2-(chloromethyl)pyridine dissolved in 30 ml of benzene. The mixture was allowed to warm and stirred overnight. Next day the resulting mixture was treated with 50 ml of water, the organic phase was collected, dried with MgSO$_4$ and evaporated to give 20 g (93%) of the product as a mixture of isomers. This substance was used without further purification.

NMR $^1$H (CDCl$_3$): 8.65 (m, 1H); 7.62 (dt, 1H); 7.36-7.02 (group of signals, 11H); 6.18 (br.s, 1H); 4.07 (m, 1H); 3.92 (br.s, 2H); 3.29 (dd, 1H); 2.98 (dd, 1H).

8.60 (m, 1H); 7.54 (dt, 1H); 7.36-7.02 (group of signals, 11H); 6.25 (br.s, 1H); 4.12 (br.s, 2H); 3.80 (m, 1H); 3.16 (m, 1H); 2.87 (dd, 1H).

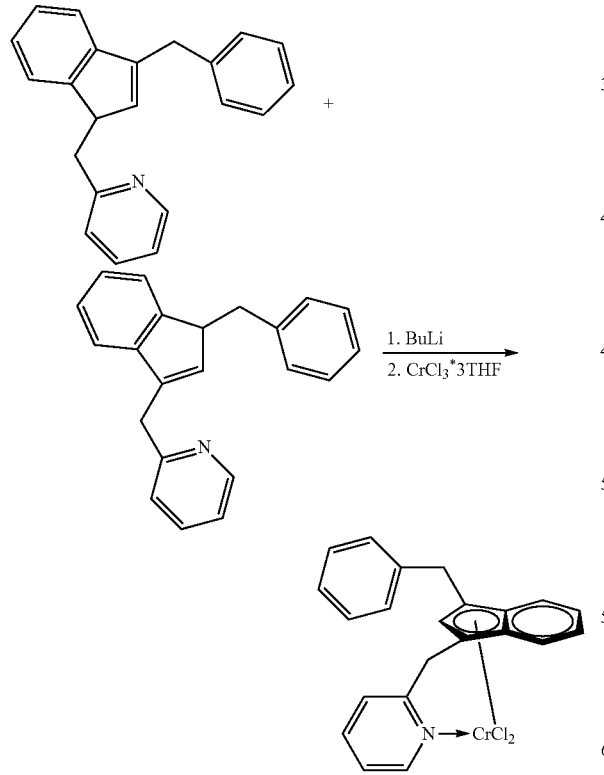

20 g (0.0673 mol) of the above-prepared ligand was dissolved in 210 ml of THF and was treated with 27 ml of 2.5M BuLi in hexanes (0.0673 mol) at −80° C. The reaction mixture was stirred an additional hour at the same temperature (−80° C.), then it was allowed to warm to r.t. and stirred for 3 h. The resulting red reaction mixture was cooled to −60° C. and was treated with 25.2 g (0.0673 mol) of CrCl$_3$*3THF. The so-obtained black reaction mixture was allowed to warm to room temperature. and stirred overnight. Next day the resulting green suspension was refluxed in 2 h, then it was cooled to r.t. and filtered. The green solid was washed 2 times with THF, 3 times with ether and dried to give 13 g (46%) of the crude product. 8 g of the crude product was dissolved in 100 ml of CH$_2$Cl$_2$ and filtered. The resulting green solution was evaporated up to the volume 20 ml. Green crystalline solid was isolated, washed twice with cold CH$_2$Cl$_2$ and dried to give 6 g of recrystallized product η$^5$-1-(2-methylpyridine)-3-benzylindenyl]dichlorochromium.

Catalytic Solution

A solution of 61.9 mg of complex η$^5$-1-(2-methylpyridine)-3-benzylindenyl]dichlorochromium, in 25 ml cyclohexane, 18.0 ml Tibal (20% in cyclohexane from Chemtura) and 6.3 ml PMAO (7% solution, from Akzo Nobel) were mixed. The obtained suspension was stirred for 15 minutes at room temperature. The obtained suspension (49.3 ml) had black brown colour and the concentration was 2.99 μmol/ml.

Polymerization

A 3.1 L-Steel autoclave was filled under Argon at room temperature with 450 mL cyclohexane and 1300 mL butene. The temperature was raised up to 80° C. (Speed frequency: 350). The recruit pressure was raised to 3.5 bar with 25.4 g ethylene. 300 mg Triisobutylaluminium (TIBA in cyclohexane 20%) were added. After 5 minutes of stirring catalyst solution (60.0 μmol of the solution) was added and the catalyst dosing unit was rinsed with 20 ml cyclohexane. The adjusted pressure of 13.4 bar was kept constant for 100 minutes via adding additional ethylene (75.1 g) during the polymerisation. After 100 minutes the polymerisation was stopped with 5 mL isopropanol and the autoclave was cooled down to 50° C. (Speed frequency 100). The pressure was released and the autoclave was rinsed out with nitrogen. 750 mL Exxsol D 140/170 were added and the temperature was raised up to 50° C.

The polymer was dried in high vacuum by 80° C. for 12 hours. Yield was 93.7 g, which was 3713 kg/mol Cr or 936 kg PE/(mol Cr*h)

Cr Ashes if not washed 33 ppm

Example 2

Synthesis of [η$^5$-1-(2-methylpyridine)-2-methyl-3-benzyl-1,5,6,7-tetrahydro-s-indacen-1-yl]dichlorochromium

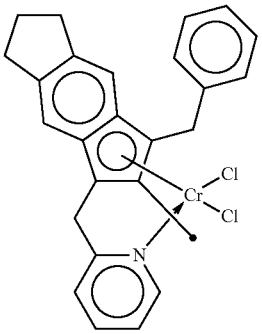

Preparation of 2-methyl-3,5,6,7-tetrahydro-s-indacen-1(2H)-one

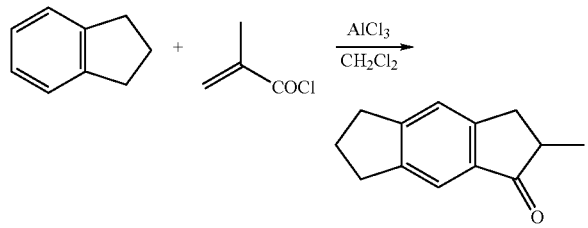

Methacryloyl chloride (50 ml, 0.5 mol) was added to a suspension of 133.5 g (1 mol) AlCl₃ in 500 ml CH₂Cl₂ at −78° C. and stirred for 20 min. Then 59 g (0.5 mol) indane was added at the same temperature. The mixture was allowed to warm to room temperature and then was stirred overnight. Next day the mixture obtained was poured carefully into a mixture of ice (1000 g) and HCl (200 ml). The organic phase was separated, washed with water and 5% NaHCO₃, and dried over MgSO₄. Solvent was evaporated and residue was distilled in vacuum giving 77.6 g of product (83%), b.p. 118-120° C./0.5 torr.

NMR $^1$H(CDCl3): 7.59 (s, 1H); 7.28 (s, 1H); 3.34 (dd, 1H); 2.92 (m, 4H); 2.80-2.65 (group of signals, 2H); 2.13 (m, 2H); 1.42 (d, 3H).

$^{13}$C 208.90, 152.82, 152.45, 143.96, 134.91, 121.85, 199.00, 42.25, 34.52, 32.90, 31.85, 25.61, 16.33

Preparation of 6-methyl-1,2,3,5-tetrahydro-s-indacene

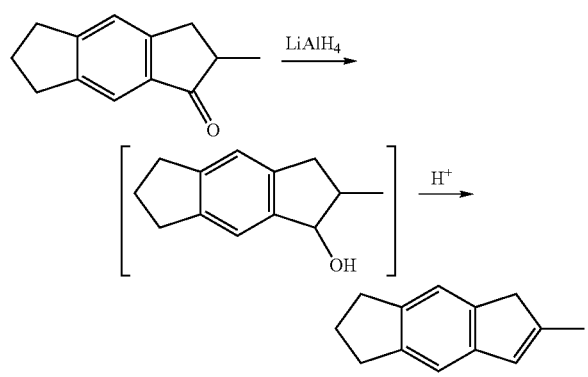

3.8 g (0.1 mol) of LiAlH₄ was carefully added to a solution of 37.2 g (0.2 mol) of 2-methyl-3,5,6,7-tetrahydro-s-indacen-1(2H)-one (obtained in example 1.1) in 300 ml of Et₂O under cooling (0° C.) and while stirring. The resulting mixture was allowed to warm to room temperature and then was stirred overnight. Next day the mixture obtained was cooled to 0° C. and 10% HCl was carefully added. The organic phase was separated, dried over MgSO₄. 0.5 g of TSA (para-toluene sulfonic acid) was then added and the reaction mixture was refluxed for 1 h. Subsequently, it was washed with water solution of NaHCO₃ and saturated water solution of NaCl. The organic phase was dried over MgSO₄, evaporated and then isolated by distillation. This gave 28.5 g of 6-methyl-1,2,3,5-tetrahydro-s-indacene (83%). B.p. 140° C./5 torr.

NMR $^1$H (CDCl₃): 7.34 (s, 1H); 7.24 (s, 1H); 6.56 (s, 1H); 3.34 (s, 2H); 3.05 (m, 4H); 2.30-2.20 (group of signals, 5H).

Synthesis of 2-[(3-benzyl-2-methyl-1,5,6,7-tetrahydro-s-indacen-1-yl)methyl]pyridine and 2-[(3-benzyl-2-methyl-3,5,6,7-tetrahydro-s-indacen-1-yl)methyl]pyridine

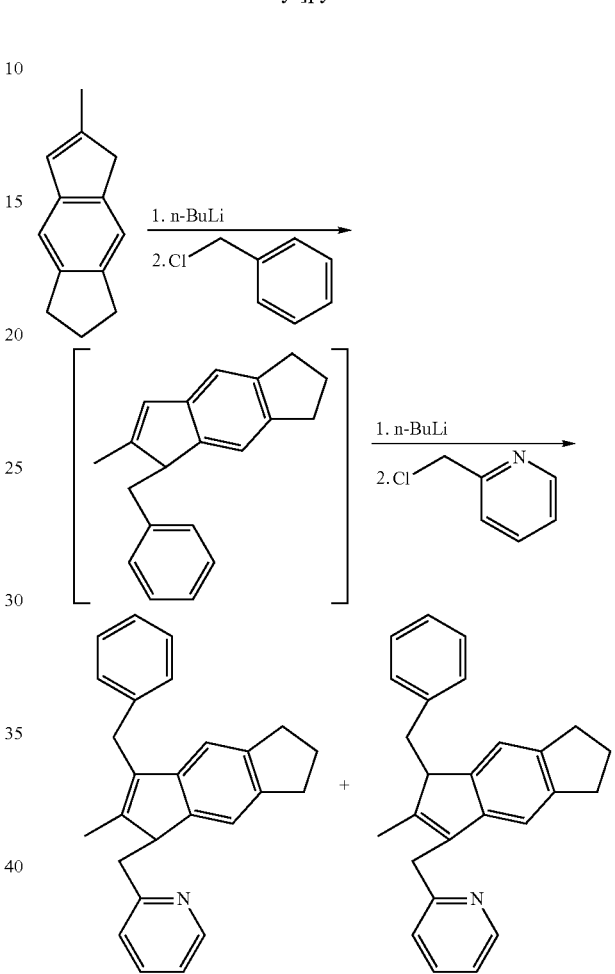

6-methyl-1,2,3,5-tetrahydro-s-indacene (17.2 g, 0.1 mol) and Et₂O (180 ml) were placed into 500 ml bulb. This solution was cooled to −20° C. and 2.5 M n-butyllithium in hexane (40 ml, 0.1 mol) were added during 20 min while stirring. The mixture was allowed to warm to room temperature while stirring for 4 h. Then the mixture was cooled again (−20° C.) and treated with the solution of (chloromethyl)benzene (11.5 ml, 0.1 mol) in 30 ml of Et₂O. The resulting mixture was allowed to warm to room temperature and stirred overnight. Next day the mixture obtained was cooled to −20° C. and 2.5 M n-butyllithium in hexane (40 ml, 0.1 mol) was added in 20 min while stirring. The cooling was removed and the reaction mixture was allowed to stir for 4 h. Then it was cooled to 0° C. and treated with the solution of 2-(chloromethyl) pyridine (12.7 g, 0.1 mol) in 20 ml of benzene. The resulting mixture was allowed to warm to room temperature and then was stirred overnight. Next day 80 mol of water were added. The organic layer was isolated; the aqueous layer was extracted 2 times with 40 ml of Et₂O. The organic phase was dried over MgSO₄ and evaporated. The residue was redissolved in toluene and solution obtained was evaporated again to give quantitative amount of the desirable compound as a mixture of the isomers. This substance was used in the next step without purification.

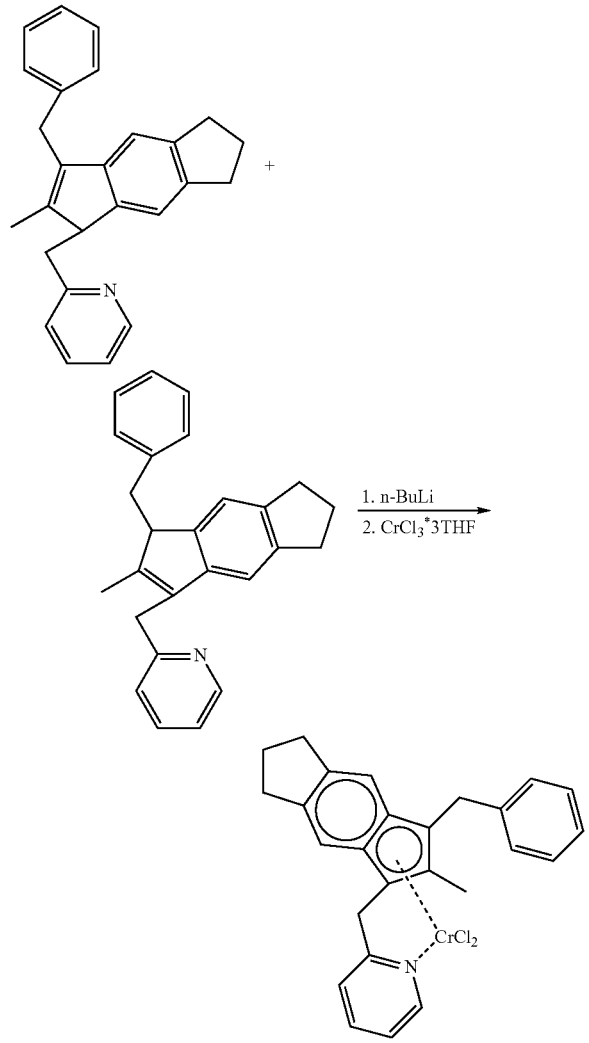

The mixture of isomers prepared in the previous step was dissolved in 150 ml of THF. Resulting solution was cooled to −70° C. and was treated with 2.5 M n-butyllithium in hexane (38 ml, 0.095 mol) in 20 min under stirring. The resulting mixture was stirred at the same temperature for additional 1 h and then it was allowed to warm up to room temperature and stirred 3 h. Then the mixture was cooled again to −60° C. and was treated with 35.5 g (0.095 mol) of CrCl$_3$*3THF. The resulting mixture was allowed to warm to room temperature and then was stirred overnight. Next day the reaction mixture was refluxed within 1 h then it was cooled to −10° C. and finally it was filtered to give the green precipitate. This precipitate was washed with 50 ml of cold THF, then with 100 ml of ether and then was dried to give 26.3 g of the crude product (~50% from the indene). 13 g of the crude product was dissolved in 100 ml of CH$_2$Cl$_2$, then the half of the solvent was evaporated and the resulting solution was treated with 50 ml of the pentane. The resulting suspension was filtered (to get free from thin white precipitate) and the resulting solution was evaporated to give green crystalline solid. This solid was washed with 100 ml of the CH$_2$Cl$_2$/pentane and dried. 8 g of the compound A was isolated. From the mother solution 1-2 g more of the compound can be isolated.

Catalytic Solution

A solution of 46.0 mg of [η$^5$-1-(2-methylpyridine)-2-methyl-3-benzyl-1,5,6,7-tetrahydro-s-indacen-1-yl]dichlorochromium in 15 ml cyclohexane, 11.5 ml Triisobutylaluminum (20% TIBA in cyclohexane from Chemtura) and 4.0 ml PMAO (7% solution, from Akzo Nobel) were mixed. The obtained suspension was stirred for 15 minutes at room temperature. The obtained suspension (30.5 ml) red brown colour and the concentration was 3.19 μmol/ml.

Polymerization

A 3.1 L-Steel autoclave was filled under Argon at room temperature with 450 mL cyclohexane and 1300 mL butene. The temperature was raised up to 80° C. (Speed frequency: 350). The recruit pressure was raised to 4.5 bar with 38.7 g ethylene. 300 mg Triisobutylaluminium (TIBA in cyclohexane 20%) were added. After 5 minutes of stirring catalyst solution (61.9 μmol of the solution) was added and the catalyst dosing unit was rinsed with 20 ml cyclohexane. The adjusted pressure of 14.5 bar was kept constant for 102 minutes via adding additional ethylene (115.6 g) during the polymerisation. After 102 minutes the polymerisation was stopped with 5 mL isopropanol and the autoclave was cooled down to 50° C. (Speed frequency 100). The pressure was released and the autoclave was rinsed out with nitrogen. 750 mL Exxsol D 140/170 were added and the temperature was raised up to 50° C.

The polymer was dried in high vacuum by 80° C. for 12 hours. Yield was 179.2 g, which was 6117 kg/mol Cr or 1703 kg PE/(mol Cr*h)

Cr Ashes if not washed 17.4 ppm

Example 3

Catalytic Solution

A solution of 35.3 mg of η$^5$-1-(2-methylpyridine)-3-benzylindenyl]dichlorochromium (complex of example 1), in 15 ml cyclohexane, 10.3 ml Tibal (20% in cyclohexane from Chemtura) and 3.6 ml PMAO (7% solution, from Akzo Nobel) were mixed. The obtained suspension was stirred for 15 minutes at room temperature. The obtained suspension (28.9 ml) had black brown colour and the concentration was 2.91 μmol/ml.

Polymerization

A 3.1 L-Steel autoclave was filled under Argon at room temperature with 450 mL cyclohexane and 1300 mL butene. The temperature was raised up to 80° C. (Speed frequency: 350). The recruit pressure was raised to 3.5 bar with 26.1 g ethylene. 300 mg Triisobutylaluminium (TIBA in cyclohexane 20%) were added. After 5 minutes of stirring catalyst solution (59.9 μmol of the solution) was added and the catalyst dosing unit was rinsed with 20 ml cyclohexane. The adjusted pressure of 13.4 bar was kept constant for 102 minutes via adding additional ethylene (88.3 g) during the polymerisation. After 102 minutes the polymerisation was stopped with 5 mL isopropanol and the autoclave was cooled down to 50° C. (Speed frequency 100). The pressure was released and the autoclave was rinsed out with nitrogen. 750 mL Exxsol D 140/170 were added and the temperature was raised up to 50° C.

The polymer was dried in high vacuum by 80° C. for 12 hours. Yield was 94.7 g, which was 3764 kg/mol Cr or 931 kg PE/(mol Cr*h)

Cr Ashes if not washed 32 ppm

Example 4

Catalytic Solution

A solution of 45.1 mg of [η$^5$-1-(2-methylpyridine)-2-methyl-3-benzyl-1,5,6,7-tetrahydro-s-indacen-1-yl]dichlorochromium (complex of example 2), in 15 ml cyclohexane, 11.3 ml Tibal (20% in cyclohexane from Chemtura) and 4.0 ml PMAO (7% solution, from Akzo Nobel) were mixed. The obtained suspension was stirred for 15 minutes at room temperature. The obtained suspension (30.3 ml) red brown colour and the concentration was 3.14 μmol/ml.

Polymerization

A 3.1 L-Steel autoclave was filled under Argon at room temperature with 450 mL cyclohexane and 1300 mL butene. The temperature was raised up to 80° C. (Speed frequency: 350). The recruit pressure was raised to 3.5 bar with 25.2 g ethylene. 300 mg Triisobutylaluminium (TIBA in cyclohexane 20%) were added. After 5 minutes of stirring catalyst solution (61.5 μmol of the solution) was added and the catalyst dosing unit was rinsed with 20 ml cyclohexane. The adjusted pressure of 13.4 bar was kept constant for 101 minutes via adding additional ethylene (91.1 g) during the polymerisation. After 101 minutes the polymerisation was stopped with 5 mL isopropanol and the autoclave was cooled down to 50° C. (Speed frequency 100). The pressure was released and the autoclave was rinsed out with nitrogen. 750 mL Exxsol D 140/170 were added and the temperature was raised up to 50° C.

The polymer was dried in high vacuum by 80° C. for 12 hours. Yield was 159.2 g, which was 5464 kg/mol Cr or 1537 kg PE/(mol Cr*h)

Cr Ashes if not washed 19.6 ppm

Table No. 1 summarizes the properties of the ethylene copolymers obtained as described in the above examples 1-4:

TABLE NO. 1

| Ex. | η [dl/g] | MFR [dg/min] | GPC $M_w$ [g/mol] | GPC $M_w/M_n$ | $^{13}$C-NMR $C_4$ [wt %] | $^{13}$C-NMR $C_3$ [wt %] | $T_g$ [° C.] | Density [g/ml] | $\Delta H_f$ [J/g] |
|---|---|---|---|---|---|---|---|---|---|
| 1 | 1.7 | 0.9 | 91831 | 2.8 | 27.9 | 2.4 | −48 | 0.868 | 13.1 |
| 2 | 1.4 | 2.4 | 71167 | 3.5 | 28.6 | 2.6 | −50 | 0.867 | 8.1 |
| 3 | 1.3 | 3.4 | 65405 | 2.7 | 29.5 | 2.2 | −53 | 0.869 | 17.0 |
| 4 | 2.1 | 0.3 | 100586 | 2.9 | 31.6 | 3.4 | −54 | 0.864 | 3.6 |
| CE 1 | 1.4 | 2.4 | 88098 | 2.5 | 28.3 | 0 | −43 | 0.873 | 26.7 |
| CE 2 | 1.3 | 3.4 | 87290 | 2.5 | 30.8 | 0 | −44 | 0.863 | 25.5 |
| CE 3 | 1.7 | 0.9 | 123385 | 2.5 | 31.0 | 0 | −47 | 0.865 | 14.1 |
| CE 4 | 1.8 | 0.7 | 120236 | 2.6 | 33.3 | 0 | −49 | 0.863 | 13.0 |

CE 1-4 are comparative examples of elastomeric ethylene copolymers available on the market.

Clearly, for similar or lower content of the comonomer $C_4$, the elastomeric ethylene copolymers according to the invention show a considerably lower glass transition temperature $T_g$ in comparison with the prior art.

Table No. 2 summarizes the $^{13}$C-NMR side chains content results of the same copolymers 1-4:

TABLE No. 2

| Example | Me/1000 C. | Et/1000 C. | Pr/1000 C. |
|---|---|---|---|
| 1 | 8.1 | 69.3 | 1.2 |
| 2 | 8.7 | 71.2 | 0.8 |
| 3 | 7.4 | 73.6 | 1.1 |
| 4 | 11.2 | 78.7 | 0.8 |

Table No. 3 summarizes the mechanical properties of the elastomeric ethylene copolymers obtained through examples 1-4:

TABLE No. 3

| Example | Shore A [5 sec] | Stress at break [MPa] | Elongation at break |
|---|---|---|---|
| 1 | 44.4 | 1.6 | 1350 |
| 2 | 35.0 | 0.9 | 2710 |
| 3 | 33.8 | 0.5 | 650 |
| 4 | 24.2 | 0.4 | 4000 |
| CE 1 | 66.4 | 3.4 | 717 |
| CE 2 | 48.8 | 1.7 | 650 |
| CE 3 | 56.0 | 2.5 | 763 |
| CE 4 | 51.8 | 2.0 | 706 |

With respect of the comparative examples CE 1-4, the copolymers according to the invention show considerably lower values of Shore A (5 seconds) hardness, as well as generally superior elastomeric performances, both in terms of stress at break and elongation at break.

The invention claimed is:

1. A copolymer of ethylene and at least one first a-olefin comonomer having n carbon atoms, and at least one second a-olefin comonomer having (n−1) carbon atoms, n being from 4 to 13, wherein the copolymer comprises from 60 to 80% by weight of ethylene and wherein the combined weight of the first and second comonomers is from 20 to 40% by weight of the copolymer, and wherein the copolymer has a polydispersity $M_w/M_n$ equal to or lower than 3.5, and a density from 0.855 to 0.880 g/cm$^3$.

2. The copolymer according to claim 1, which comprises of from 15 to 35% by weight of said first a-olefin comonomer.

3. The copolymer according to claim 1, which comprises from 0.5 to 5% by weight of said second a-olefin comonomer.

4. The copolymer according to claim 1, which has a glass transition temperature $T_g$ lower than −30° C.

5. The copolymer according to claim 1, which has an $MFR_{190/2.16}$ in the range from 0.1 to 10 dg/min.

6. A composition comprising an ethylene copolymer according to claim 1 and an ethylene homopolymer.

7. A process for copolymerizing ethylene and at least a first α-olefin comonomer having n carbon atoms, and a second a-olefin comonomer having (n−1) carbon atoms thereby producing a copolymer, n being from 4 to 13, said process comprising the steps of:

providing a catalyst system comprising a catalyst containing a transition metal complex that forms said copolymer while producing said at least one second α-olefin comonomer from ethylene; and subjecting ethylene and said at least one first α-olefin comonomer to a polymerization stage in the presence of said catalyst system.

8. The process of claim 7, wherein said catalyst system comprises a catalyst containing a chromium complex.

9. The process according to claim 8, wherein the catalyst comprises a monocyclopentadienyl complex of the formula

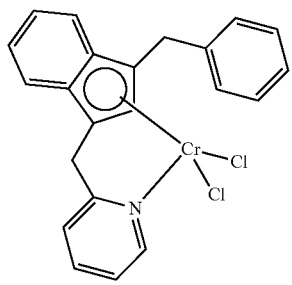

and/or of the formula

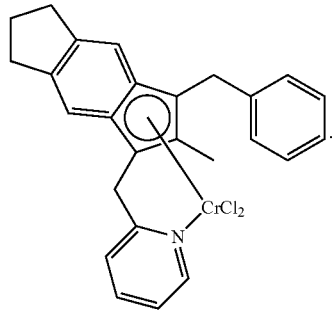

10. The process according to claim 7, wherein at least 50% of the second comonomer is produced during the polymerization stage in situ and by the same catalyst that produces said copolymer in the polymerization stage.

11. The process of claim 10, wherein at least 90% of the second monomer is produced during the polymerization in situ.

* * * * *